US008631347B2

(12) United States Patent
Schilling et al.

(10) Patent No.: US 8,631,347 B2
(45) Date of Patent: Jan. 14, 2014

(54) ELECTRONIC DOCUMENT STYLE MATRIX

(75) Inventors: John R. Schilling, Seattle, WA (US); Howard L. Cooperstein, Mountain View, WA (US); Michael J. Antonio, Seattle, WA (US); Keri D. Vandeberghe, Seattle, WA (US); Vlada Knowlton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 818 days.

(21) Appl. No.: 10/989,587

(22) Filed: Nov. 15, 2004

(65) Prior Publication Data

US 2006/0107203 A1    May 18, 2006

(51) Int. Cl.
*G06F 17/00* (2006.01)
(52) U.S. Cl.
USPC ........... 715/810; 715/243; 715/249; 715/227; 715/726; 715/763; 715/764; 715/765; 715/767; 715/766; 715/826; 715/835; 715/838; 715/839; 715/840; 715/841; 715/842
(58) Field of Classification Search
USPC ......... 715/517, 523, 509, 243, 249, 227, 726, 715/810, 763–767, 826, 835, 838–842
See application file for complete search history.

(56) References Cited

U.S. PATENT DOCUMENTS

| 4,498,145 A | 2/1985 | Baker et al. | |
|---|---|---|---|
| 5,276,793 A * | 1/1994 | Borgendale et al. | 715/513 |
| 5,386,506 A | 1/1995 | Satoh et al. | 715/853 |
| 5,664,208 A | 9/1997 | Pavley et al. | 715/209 |
| 5,680,525 A | 10/1997 | Sakai et al. | 345/585 |
| 5,682,468 A | 10/1997 | Fortenbery et al. | |
| 5,749,083 A | 5/1998 | Koda et al. | 715/205 |
| 5,794,030 A | 8/1998 | Morsi et al. | 707/103 R |
| 5,850,507 A | 12/1998 | Ngai et al. | |
| 6,154,756 A | 11/2000 | Hearn et al. | 715/236 |
| 6,282,547 B1 | 8/2001 | Hirsch | |

(Continued)

FOREIGN PATENT DOCUMENTS

| JP | 07-121511 | 5/1995 |
|---|---|---|
| JP | 08-055112 | 2/1996 |
| JP | 08-083271 | 3/1996 |
| JP | 10-124027 | 5/1998 |

OTHER PUBLICATIONS

Rose, Carla, "Sams Teach Yourself Adobe Photoshop 5.5 in 24 Hours", Oct. 21, 1999, Sams, pp. 1-16 + 1 cover page, 17 total pages.*

(Continued)

*Primary Examiner* — Adam M Queler
*Assistant Examiner* — David Faber
(74) *Attorney, Agent, or Firm* — Merchant & Gould P.C.

(57) ABSTRACT

A method and system for rendering electronic document objects is provided in which a style matrix holds potential attribute values, and attribute references are used to address values in the style matrix. A mix of attribute references and actual attribute values may be used to make some attributes theme- and application-specific, and others theme- and application-independent. Further, a method for rendering a gallery of potential styles is provided. Additionally, a method for associating a style matrix with an electronic document application is provided. Finally, a computer-readable medium for storing a computer-interpretable data structure that identifies a matrix of style attribute types and style attribute values is provided.

19 Claims, 7 Drawing Sheets

(56) References Cited

U.S. PATENT DOCUMENTS

| | | | | |
|---|---|---|---|---|
| 6,345,284 | B1* | 2/2002 | Dinkelacker | 715/201 |
| 6,374,251 | B1 | 4/2002 | Fayyad et al. | |
| 6,380,954 | B1 | 4/2002 | Gunther | |
| 6,493,826 | B1 | 12/2002 | Schofield et al. | |
| 6,539,396 | B1 | 3/2003 | Bowman-Amuah | |
| 6,618,851 | B1 | 9/2003 | Zundel et al. | |
| 6,654,757 | B1 | 11/2003 | Stern | |
| 6,675,355 | B1 | 1/2004 | Demopoulos et al. | 715/233 |
| 6,711,577 | B1 | 3/2004 | Wong et al. | |
| 6,725,421 | B1 | 4/2004 | Boucher et al. | 715/205 |
| 6,732,090 | B2 | 5/2004 | Shanahan et al. | |
| 6,772,170 | B2 | 8/2004 | Pennock et al. | |
| 6,778,979 | B2 | 8/2004 | Grefenstette et al. | |
| 6,820,075 | B2 | 11/2004 | Shanahan et al. | |
| 6,871,319 | B2* | 3/2005 | Taboada et al. | 715/227 |
| 6,934,740 | B1 | 8/2005 | Lawande et al. | 709/213 |
| 6,986,123 | B2 | 1/2006 | Finocchio | |
| 7,055,132 | B2 | 5/2006 | Bogdan et al. | |
| 7,275,207 | B2* | 9/2007 | Aureglia et al. | 715/214 |
| 7,412,658 | B2 | 8/2008 | Gilboa | |
| 7,499,955 | B2 | 3/2009 | Kao et al. | |
| 7,533,332 | B2* | 5/2009 | Taboada et al. | 715/227 |
| 7,546,523 | B2* | 6/2009 | Aureglia et al. | 715/218 |
| 7,703,036 | B2* | 4/2010 | Satterfield et al. | 715/777 |
| 7,707,550 | B2 | 4/2010 | Resnick et al. | |
| 7,721,205 | B2 | 5/2010 | Morgan et al. | |
| 7,757,212 | B2 | 7/2010 | Wagner et al. | |
| 7,783,971 | B2 | 8/2010 | Villaron et al. | |
| 8,001,526 | B2 | 8/2011 | Morgan | |
| 2002/0002567 | A1 | 1/2002 | Kanie et al. | 707/513 |
| 2002/0113797 | A1 | 8/2002 | Potter et al. | |
| 2002/0174143 | A1* | 11/2002 | Taboada et al. | 707/509 |
| 2003/0078913 | A1 | 4/2003 | McGreevy | |
| 2003/0078935 | A1 | 4/2003 | Zibin et al. | |
| 2003/0149708 | A1 | 8/2003 | Tsao | 707/104.1 |
| 2003/0167447 | A1* | 9/2003 | Hatta et al. | 715/517 |
| 2003/0188257 | A1* | 10/2003 | Aureglia et al. | 715/503 |
| 2003/0188258 | A1* | 10/2003 | Aureglia et al. | 715/503 |
| 2003/0188259 | A1* | 10/2003 | Aureglia et al. | 715/503 |
| 2004/0002991 | A1 | 1/2004 | Bogdan et al. | |
| 2004/0003138 | A1 | 1/2004 | Finocchio | |
| 2004/0189667 | A1 | 9/2004 | Beda et al. | |
| 2004/0220954 | A1 | 11/2004 | Zhou et al. | |
| 2004/0230888 | A1 | 11/2004 | Kramer et al. | |
| 2004/0230900 | A1 | 11/2004 | Relyea et al. | |
| 2005/0015729 | A1 | 1/2005 | Fernandez et al. | |
| 2005/0017984 | A1 | 1/2005 | Lawther et al. | 345/589 |
| 2005/0120297 | A1* | 6/2005 | Taboada et al. | 715/510 |
| 2005/0171967 | A1 | 8/2005 | Yuknewicz et al. | |
| 2005/0174473 | A1* | 8/2005 | Morgan et al. | 348/370 |
| 2005/0216883 | A1 | 9/2005 | Ishimitsu et al. | |
| 2005/0268229 | A1* | 12/2005 | Wessling et al. | 715/528 |
| 2005/0278625 | A1 | 12/2005 | Wessling et al. | |
| 2006/0107203 | A1 | 5/2006 | Schilling et al. | |
| 2006/0230311 | A1 | 10/2006 | Kao et al. | |
| 2006/0242591 | A1 | 10/2006 | Van Dok et al. | |
| 2007/0006073 | A1* | 1/2007 | Gerhard et al. | 715/517 |
| 2007/0061343 | A1 | 3/2007 | Morgan | |
| 2007/0061349 | A1 | 3/2007 | Morgan et al. | |
| 2007/0061351 | A1 | 3/2007 | Villaron et al. | |
| 2007/0074156 | A1 | 3/2007 | Nelson et al. | |
| 2007/0094607 | A1 | 4/2007 | Morgan et al. | |
| 2007/0106952 | A1 | 5/2007 | Matas et al. | |
| 2007/0174307 | A1 | 7/2007 | Villaron et al. | |
| 2008/0263070 | A1 | 10/2008 | Villaron et al. | 707/101 |

OTHER PUBLICATIONS

Steele, "Sams Teach Yourself Microsoft Office Word 2003 in 24 Hours", Sams, Sep. 23, 2003, pp. 1-8.*

Microsoft, "Microsoft Excel 2003", 2003, Microsoft, FIG 0-9, 9a, 10-19 (21 pages total).*

Microsoft, "Microsoft Paint", 2001, Microsoft, FIG 0-1, 1 page (3 pages total).*

Keizer, George, "Microsoft Office System—CNET Reviews", Oct. 21, 2003, CNET, pp. 1-18.*

Microsoft, "Microsoft Excel 2003", 2003, Microsoft, FIGS 20-35 (16 pages total).*

Microsoft, "Microsoft Excel 2003", 2003 FIGs 36-39, 40a-d, 41-52 (20 pages total).*

Hakon Wium Lie, "Cascading Style Sheets, Level 1," [Internet Citation Retrieved May 10, 2000], W3C Recommendation, Dec. 17, 1996, XP002968018, 49 pp. http://www.w3.org/pub/WWW/TR/REC-CSS1.

European Search Report dated Sep. 5, 2008, issued in Application No. 05109783.0-1527 filed by Microsoft Corporation, 11 pp., Ref. No. EP36056TE900dfi.

Third Office Action, dated Jul. 10, 2009, in Chinese Patent Application No. 200510116336.5, 12 pgs.

USPTO Non-Final Office Action dated Sep. 14, 2010, cited in U.S. Appl. No. 11/479,980, 24 pages.

Amendment and Response to U.S. Patent Office Non-Final Office Action dated Oct. 15, 2008, cited in U.S. Appl. No. 11/479,980, filed Apr. 15, 2009; 10 pages.

Amendment and Response to U.S. Patent Office Final Office Action dated Jun. 19, 2009, cited in U.S. Appl. No. 11/479,980, filed Sep. 21, 2009; 11 pages.

Amendment and Response to U.S. Patent Office Non-Final Office Action dated Oct. 27, 2009, cited in U.S. Appl. No. 11/479,980, filed Jan. 27, 2010; 8 pages.

Amendment and Response to U.S. Patent Office Final Office Action dated Apr. 19, 2010, cited in U.S. Appl. No. 11/479,980, filed Jul. 19, 2010; 10 pages.

Chinese Patent Office's Notice on Grant of Patent Right for Invention cited in Chinese Application No. 200510116336.5, dated Oct. 23, 2009 (in Chinese with English translation attached); 4 pages.

Chinese Patent Office's Patent Certificate for Invention cited in Chinese Application No. 200510116336.5 (Patent No. ZL 200510116336.5) dated Jan. 20, 2010 (in Chinese with English translation attached); 4 pages.

Japanese Patent Office's Notice of Rejection cited in Japanese Application No. 2005-291384, dated Dec. 3, 2010 (in Japanese with English translation attached); 8 pages.

Amendment and Response to Non-Final Office Action filed Dec. 14, 2010 in U.S. Appl. No. 11/479,980; 11 pages.

USPTO Final Office Action cited in U.S. Appl. No. 11/479,980, dated Feb. 24, 2011; 21 pages.

European Summons for Oral Proceedings in Application EP 05109783.0 mailed Mar. 29, 2011; 7 pgs.

European Decision to Refuse Patent Application in EP Application 05109783.0 mailed Sep. 9, 2011; 22 pgs.

European Minutes from the Decision to Refuse Patent Application in EP Application 05109783.0 mailed Sep. 9, 2011; 9 pgs.

Japanese Final Rejection in Application No. 2005-291384, mailed Nov. 18, 2011, 3 pages of English Translation, 2 pages of Japanese Rejection (5 pages total).

Millstein et al., "Modular typechecking for hierarchically extensible datatypes and functions", Oct. 2002, pp. 110-122, <http://delivery.acm.org/10.1145/590000/581489/p110-millstein.pdf>.

U.S. Appl. No. 11/228,616, Advisory Action mailed Sep. 29, 2008, 3 pgs.

U.S. Appl. No. 11/228,616, Amendment and Response filed Feb. 19, 2008, 9 pgs.

U.S. Appl. No. 11/228,616, Amendment and Response filed Mar. 5, 2010, 19 pgs.

U.S. Appl. No. 11/228,616, Amendment and Response filed Jun. 16, 2010, 12 pgs.

U.S. Appl. No. 11/228,616, Amendment and Response filed Jun. 30, 2009, 26 pgs.

U.S. Appl. No. 11/228,616, Amendment and Response filed Sep. 15, 2008, 21 pgs.

U.S. Appl. No. 11/228,616, Amendment and Response filed Sep. 21, 2009, 9 pgs.

U.S. Appl. No. 11/228,616, Office Action mailed Jan. 8, 2010, 10 pgs.

U.S. Appl. No. 11/228,616, Office Action mailed Oct. 19, 2007, 11 pgs.

(56) References Cited

OTHER PUBLICATIONS

U.S. Appl. No. 11/228,616, Office Action mailed Mar. 16, 2010, 10 pgs.
U.S. Appl. No. 11/228,616, Office Action mailed Apr. 3, 2009, 10 pgs.
U.S. Appl. No. 11/228,616, Office Action mailed Jul. 22, 2008, 9 pgs.
U.S. Appl. No. 11/228,616, Office Action mailed Aug. 5, 2010, 8 pgs.
U.S. Appl. No. 11/228,617, Amendment and Response filed Nov. 19, 2010, 9 pgs.
U.S. Appl. No. 11/228,617, Amendment and Response filed Apr. 25, 2011, 8 pgs.
U.S. Appl. No. 11/228,617, Amendment and Response filed Jul. 12, 2010, 9 pgs.
U.S. Appl. No. 11/228,617, Notice of Allowance mailed Apr. 29, 2011, 8 pgs.
U.S. Appl. No. 11/228,617, Office Action mailed Jan. 25, 2011, 12 pgs.
U.S. Appl. No. 11/228,617, Office Action mailed Apr. 12, 2010, 17 pgs.
U.S. Appl. No. 11/228,617, Office Action mailed Aug. 23, 2010, 15 pgs.
U.S. Appl. No. 11/228,867, Advisory Action mailed Jul. 28, 2009, 3 pgs.
U.S. Appl. No. 11/228,867, Amendment and Response filed Mar. 23, 2009, 11 pgs.
U.S. Appl. No. 11/228,867, Amendment and Response filed Jul. 16, 2009, 15 pgs.
U.S. Appl. No. 11/228,867, Notice of Allowance mailed Feb. 12, 2010, 7 pgs.
U.S. Appl. No. 11/228,867, Office Action mailed Dec. 24, 2008, 13 pgs.
U.S. Appl. No. 11/228,867, Office Action mailed Jun. 8, 2009, 14 pgs.
U.S. Appl. No. 11/479,982, Amendment and Response filed Nov. 13, 2008, 9 pgs.
U.S. Appl. No. 11/479,982, Amendment and Response filed Dec. 10, 2009, 9 pgs.
U.S. Appl. No. 11/479,982, Amendment and Response filed Jun. 4, 2009, 9 pgs.
U.S. Appl. No. 11/479,982, Notice of Allowance mailed Dec. 29, 2009, 7 pgs.
U.S. Appl. No. 11/479,982, Notice of Allowance mailed Mar. 22, 2010, 7 pgs.
U.S. Appl. No. 11/479,982, Office Action mailed Feb. 4, 2009, 13 pgs.
U.S. Appl. No. 11/479,982, Office Action mailed May 13, 2008, 12 pgs.
U.S. Appl. No. 11/479,982, Office Action mailed Sep. 10, 2009, 17 pgs.
U.S. Appl. No. 11/479,983, Amendment and Response filed Oct. 12, 2009, 10 pgs.
U.S. Appl. No. 11/479,983, Amendment and Response filed Mar. 15, 2010, 9 pgs.
U.S. Appl. No. 11/479,983, Amendment and Response filed Mar. 23, 2009, 10 pgs.
U.S. Appl. No. 11/479,983, Office Action mailed Dec. 15, 2009, 11 pgs.
U.S. Appl. No. 11/479,983, Office Action mailed Dec. 22, 2008, 10 pgs.
U.S. Appl. No. 11/479,983, Office Action mailed Jun. 29, 2010, 11 pgs.
U.S. Appl. No. 11/479,983, Office Action mailed Jul. 10, 2009, 10 pgs.
Stinson, Craig and Dodge, Mark, "Microsoft Office Excel 2003 Inside Out", Microsoft Press, 2004, pp. 195-239.
U.S. Appl. No. 11/228,616, Amendment and Response originally filed Sep. 15, 2008, re-submitted with a Request for Continued Examination on Jan. 21, 2009, 46 pgs.
U.S. Appl. No. 11/228,867, Amendment and Response originally filed Jul. 16, 2009, re-submitted with a Request for Continued Examination on Dec. 7, 2009, 17 pgs.
Korean Office Action in Application KR 10-2005-0092219, mailed May 21, 2012, 5 pgs, English translation Only.
European Partial Search Report, dated Jun. 18, 2008, in Application No. EP 05109783.0, 6 pgs.
Chinese First Office Action, dated Jul. 18, 2008, in Chinese Patent Application No. 200510116336.5, 13 pgs. (pp. 1-8 English translation; pp. 9-13 foreign Office Action).
Chinese Second Office Action, dated Mar. 13, 2009, in Chinese Patent Application No. 200510116336.5, 11 pgs. (pp. 1-6 English translation; pp. 7-11 foreign language Office Action).
European Office Action, dated Mar. 23, 2009, in Application No. EP 05 109 783.0, 7 pgs.
U.S. Appl. No. 11/479,980, Office Action mailed Apr. 19, 2010, 26 pgs.
U.S. Appl. No. 11/479,980, Office Action mailed Jun. 19, 2009, 22 pgs.
U.S. Appl. No. 11/479,980, Office Action mailed Oct. 15, 2008, 20 pgs.
U.S. Appl. No. 11/479,980, Office Action mailed Oct. 27, 2009, 25 pgs.

\* cited by examiner

ELECTRONIC DOCUMENT STYLE MATRIX

TECHNICAL FIELD

The present invention relates generally to objects in an electronic document, and more particularly, to attributes for objects within the electronic document.

BACKGROUND OF THE INVENTION

In order to facilitate the creation and maintenance of a broad spectrum of electronic documents, a similarly broad spectrum of computer applications known as electronic document applications has been developed. Electronic document applications include word processors, spreadsheets, slideshow presentation applications, and web publishing applications, among others. These applications are often bundled together in the form of a productivity suite, such as Microsoft® Office.

One problem that has plagued users of productivity suites for some time is the inconsistency of appearance of objects when imported from one application into another. For example, importing a table from a word processor into a presentation application may cause the resulting table to look markedly different than it did prior to the import. As a further example, moving a graphical shape from a presentation program into a spreadsheet document often causes the resulting shape to have different attribute settings. The resulting object may have different line widths, different fill levels, and other graphical effects that diverge from the original upon import, causing the finished product to look different than intended.

Another problem common to electronic document applications relates to the creation of new content. Users must typically decide between an often-sparse selection of supplied document templates and choosing stylistic attribute values by hand. The former is disadvantageous because the finished product often lacks distinctiveness. The latter is disadvantageous because finding an acceptable combination of stylistic attributes values may involve considerable trial and error.

It is with respect to these considerations and others that the present invention has been made.

SUMMARY OF THE INVENTION

In accordance with the present invention, a computer-implemented method is provided for rendering an object within an electronic document. First, one or more attribute references associated with the object are read. Next, a lookup is performed on the attribute references to obtain actual attribute values. A property bag is then generated using the actual attribute values. Finally, the object is rendered using the property bag.

In accordance with other aspects, the present invention relates to a method for displaying a gallery of potential styles. First, an object selection is received. A lookup is then performed on one or more attribute values for each of a plurality of potential styles. Next, a plurality of property bags is generated corresponding to each of the plurality of potential styles. Finally, an object is rendered in each of the plurality of potential styles using the plurality of property bags.

In accordance with yet other aspects, the present invention relates to a system for rendering electronic document objects. A lookup module looks up an actual attribute value using an attribute reference. A property bag module creates, maintains, and deletes property bags. A render module renders objects using property bags. Finally, a gallery module renders a gallery of styles in which an object may be rendered.

In accordance will still other aspects, the present invention relates to a method for associating a style matrix with an electronic document application. First, one or more style matrices are associated with an application. Next, a signal is received to load an object. Finally, a one or more object attribute references are mapped to one or more positions in the style matrices.

In accordance will still other aspects, the present invention relates to a computer-readable medium for storing a computer-interpretable data structure that identifies a matrix of style attribute types and style attribute values. The data structure includes one or more rows, each corresponding to an attribute type, and one or more columns, each corresponding to an attribute value.

The invention may be implemented as a computer process, a computing system or as an article of manufacture such as a computer program product or computer readable media. The computer readable media may be a computer storage media readable by a computer system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

The present invention and its various embodiments are described in detail below with reference to the figures. When referring to the figures, like structures and elements shown throughout are indicated with like reference numerals. Objects depicted in the figures that are covered by another object, as well as the reference annotations thereto, are shown using dashed lines.

Generally described, the present invention relates to the application of attributes to an object being rendered in an electronic document. The attributes are defined based on references ("attribute references") to a data structure referred to herein as a "style matrix." In accordance with an exemplary embodiment, the style matrix represents a data structure that defines variations of attributes that are applicable to objects being rendered for electronic documents. Each attribute reference is associated with one of these variations defined in the style matrix. It should be appreciated that other forms of data structures are contemplated to be within the scope of the present invention.

Figure 1:
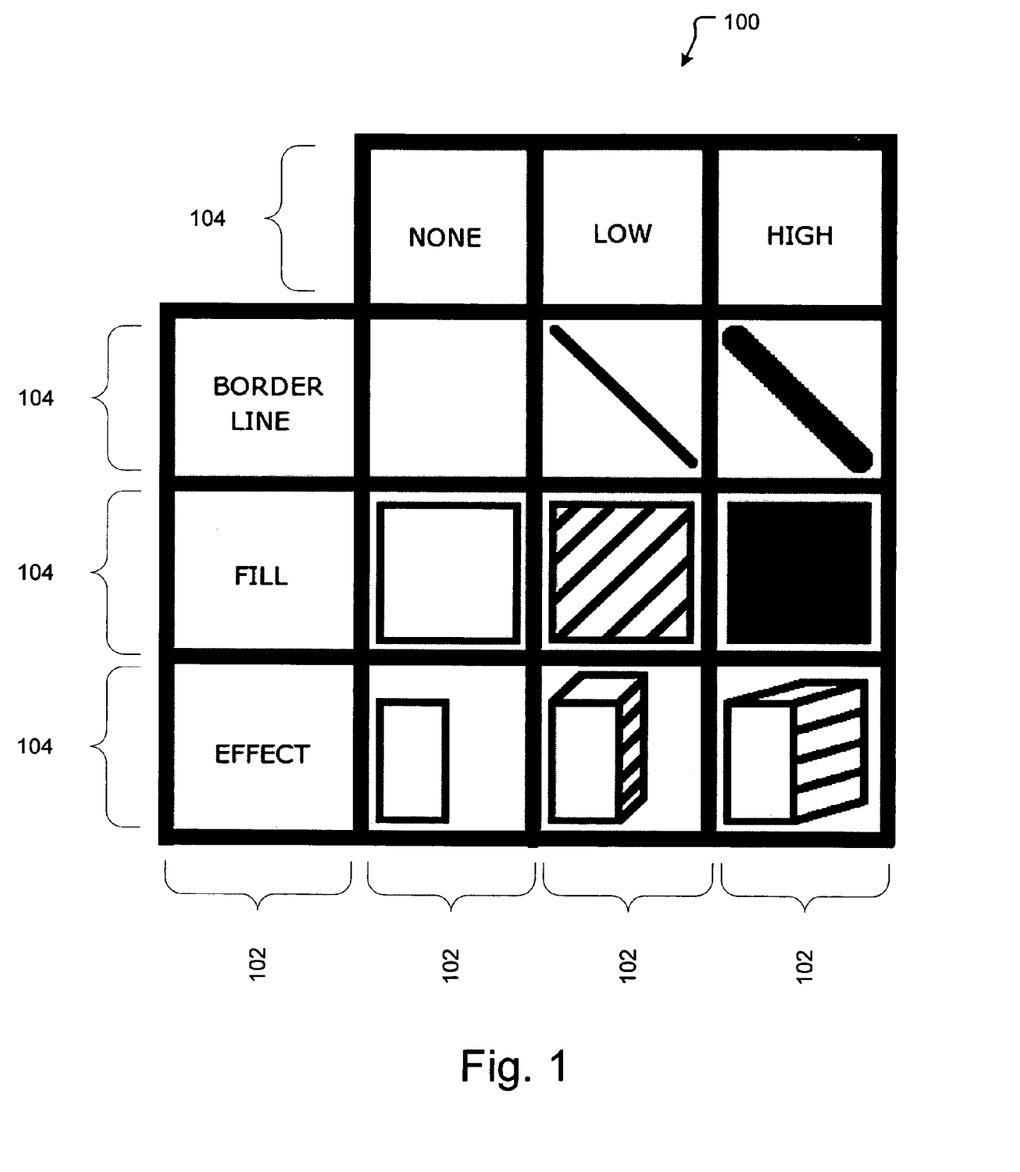
FIG. 1 illustrates a matrix ("style matrix") for use in defining attributes for objects in electronic documents in accordance with an embodiment of the present invention.

With this general description in mind, FIG. 1 illustrates a style matrix 100 in accordance with an embodiment of the present invention. The style matrix 100 includes rows 104 corresponding to various attribute types (e.g., Border Line, Fill, and Effect) and columns 102 corresponding to various attribute values (e.g., None, Low Intensity, High Intensity). An attribute is defined at the intersection of each column 102 and row 104 in the matrix 100 as being the attribute type paired with the attribute value at that intersection. For example, a Low Intensity attribute value of type Border Line depicts a thin line, whereas a High Intensity attribute value of type Line depicts a much thicker and more easily seen line. Similarly, a None attribute value of type Fill will yield no fill, whereas a Low Intensity attribute value of type Fill will yield a partially shaded fill, and so on.

While the style matrix 100 is shown with attribute types Border Line, Fill, and Effect in accordance with an exemplary embodiment or the present invention, one skilled in the art will appreciate that additional attribute types (e.g., background type, text boldness, shadowing effects, bullet types, etc.) could additionally or alternatively be included in the style matrix 100 without departing from the scope of the invention. Similarly, the style matrix 100 may include attribute values in addition to or other than the three exemplary values None, Low, and High. The style matrix 100 therefore may be arbitrarily larger or smaller than shown in FIG. 1, as dictated by the number of attribute types to be controlled (and thus, the number of rows 104) and the level of sensitivity of control (more sensitive controls would generally require more columns 102). Indeed, any number of graphical effects known to those skilled in the art (such as blurring, shadowing, mirror reflection, three dimensional, light diffusion, etc.) may be controlled by the style matrix 100 without departing from the scope of the present invention.

Figure 2:
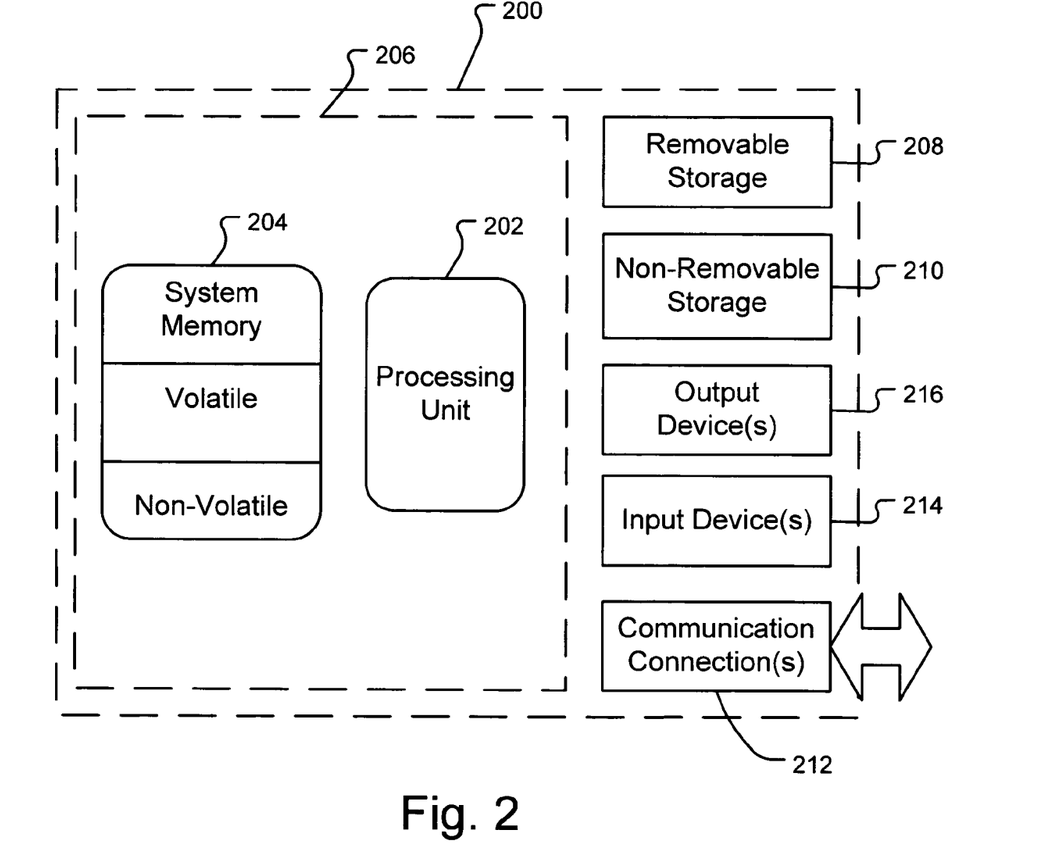
FIG. 2 illustrates an example of a suitable computing system environment on which an embodiment of the present invention may be implemented.

Given that the present invention may be implemented as a computer system, FIG. 2 is provided to illustrate an example of a suitable computing system environment on which embodiments of the invention may be implemented. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system may include at least one other form of computer-readable media. Computer-readable media can be any available media that can be accessed by the system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 204, removable storage 208, and non-removable storage 210 are all examples of computer storage media. System 200 may further provide for the at least one processing unit 202 to be communicatively coupled to memory 204, and to other computer storage media as described above, such that the at least one processing unit 202 may execute computer readable instructions stored thereon.

Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, devices such as displays, speakers, and printers. For the purposes of this invention, the display is a primary output device. Each of these devices is well know in the art and, therefore, not described in detail herein.

With the computing environment in mind, the following figures are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
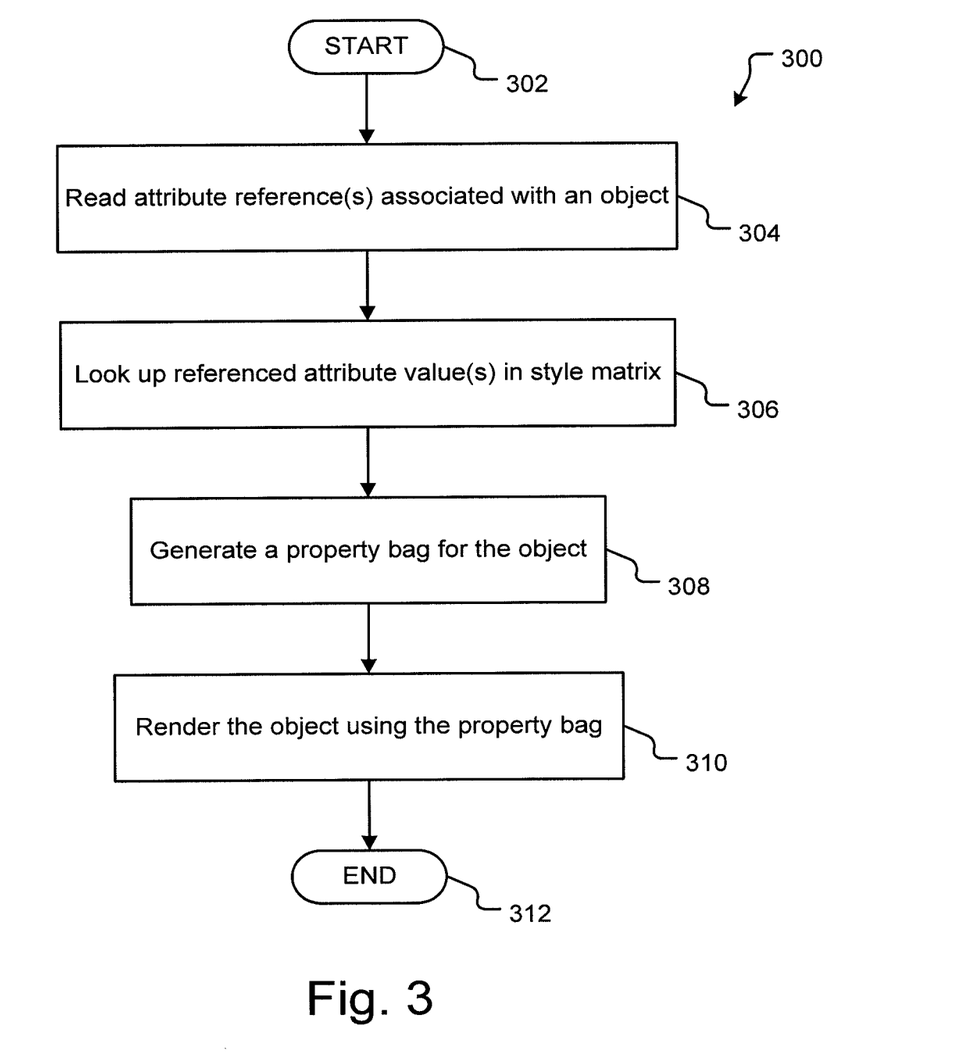
FIG. 3 is a flow diagram illustrating operational characteristics for rendering an object in an electronic document in accordance with an embodiment of the present invention.

Turning now to FIG. 3, a process 300 for rendering (hereinafter, "rendering process") an object using an attribute reference is shown in accordance with an embodiment of the present invention. The attribute reference corresponds to a row 104 and column 102 intersection in a style matrix, such as the style matrix 100 shown in FIG. 1. As such, each intersection defines an attribute that is to be applied to the object when rendered in accordance with an embodiment of the present invention. It should be appreciated that the present invention is not limited to the object having any specific number of attributes references, and indeed, any number of references are contemplated within the scope of same. Additionally, a combination of actual attribute values and attribute references may be stored or maintained according to an embodiment of the present invention. Such a combination may be used to force some attribute values to static values, while enabling others to dynamically change based on the application into which a given object is imported (and thus, the style matrix 100 addressed by an attribute reference). This embodiment provides application developers the ability to hardcode some values, while leaving others application-dependent or theme-dependent.

The rendering process 300 is performed using an operation flow beginning with a start operation 302 and ending with a terminate operation 312. The start operation 302 is initiated in response to a user requesting the display of the object in an electronic document. From the start operation 302, the operation flow passes to a retrieve operation 304. The retrieve operation 304 retrieves one or more attribute references associated with the object. In an embodiment, each attribute reference is in the form of a coordinate pair identifying by row 104 and column 102 the intersection referencing individual attribute values in the style matrix 100. Alternatively, the attribute references may be in the form of pointers to positions in memory that contains data representing the style matrix 100. Moreover, one skilled in the art will appreciate that arbitrarily many levels of additional indirection (e.g., a pointer to a pointer to a position in memory that contains the style matrix 100) may be implemented without departing from the scope of the present invention. After the retrieve operation 304 has retrieved the one or more attribute references, the operation flow passes to a look-up operation 306.

The look-up operation 306 uses the retrieved attribute reference(s) to look up the corresponding attribute value(s) in the style matrix 100. As previously discussed in conjunction with retrieve operation 304, the attribute references may take the form of coordinate addresses in the style matrix 100, or alternatively, pointers to memory, or other method of reference indirection known in the art. Thus, the look-up operation 306 may locate the referenced attribute value(s) using coordinates to traverse the matrix 100, or alternatively, by accessing the value(s) pointed to by a pointer to memory.

From the look-up operation 306 the operation flow passes to a generate operation 308. The generate operation 308 generates a property bag for the object. In an embodiment, the property bag is a structured grouping of the attribute value(s) associated with an object, as determined by the look-up operation 306. The generated property bag may be a permanent or temporary data structure, and if temporary, the property bag is destroyed or reused after the object is rendered in the electronic document (i.e., as a result of a render operation 310, described below). It should also be appreciated that the a property bag may hold other object-specific or inherited general data, in addition to one or more referenced attribute value(s).

From the generate operation 308, the operation flow passes to the render operation 310, which uses the attribute value(s) specified in the property bag to render the object appropriately in the electronic document. As such, the specified attribute(s), such as, for example, line thickness, fill type and gradient, font boldness, background, bullet types and other effects, are executed according to the referenced attribute value(s) contained in the style matrix 100. In an alternative embodiment, these attribute(s) are executed according to a combination of referenced attribute value(s) and attribute value(s) hardcoded by an application developer, as described in more detail below.

The actual rendering of the object by the render operation 310 may be accomplished using any one of a variety of approaches. For example, the render operation 310 may write the object directly to a computer screen. Alternatively, the render operation 310 may call an API (Application Program Interface) to draw the object. Other methods of rendering known to those skilled in the art may also be used by the render operation 310 and are contemplated within the scope of the present invention.

Figure 4:
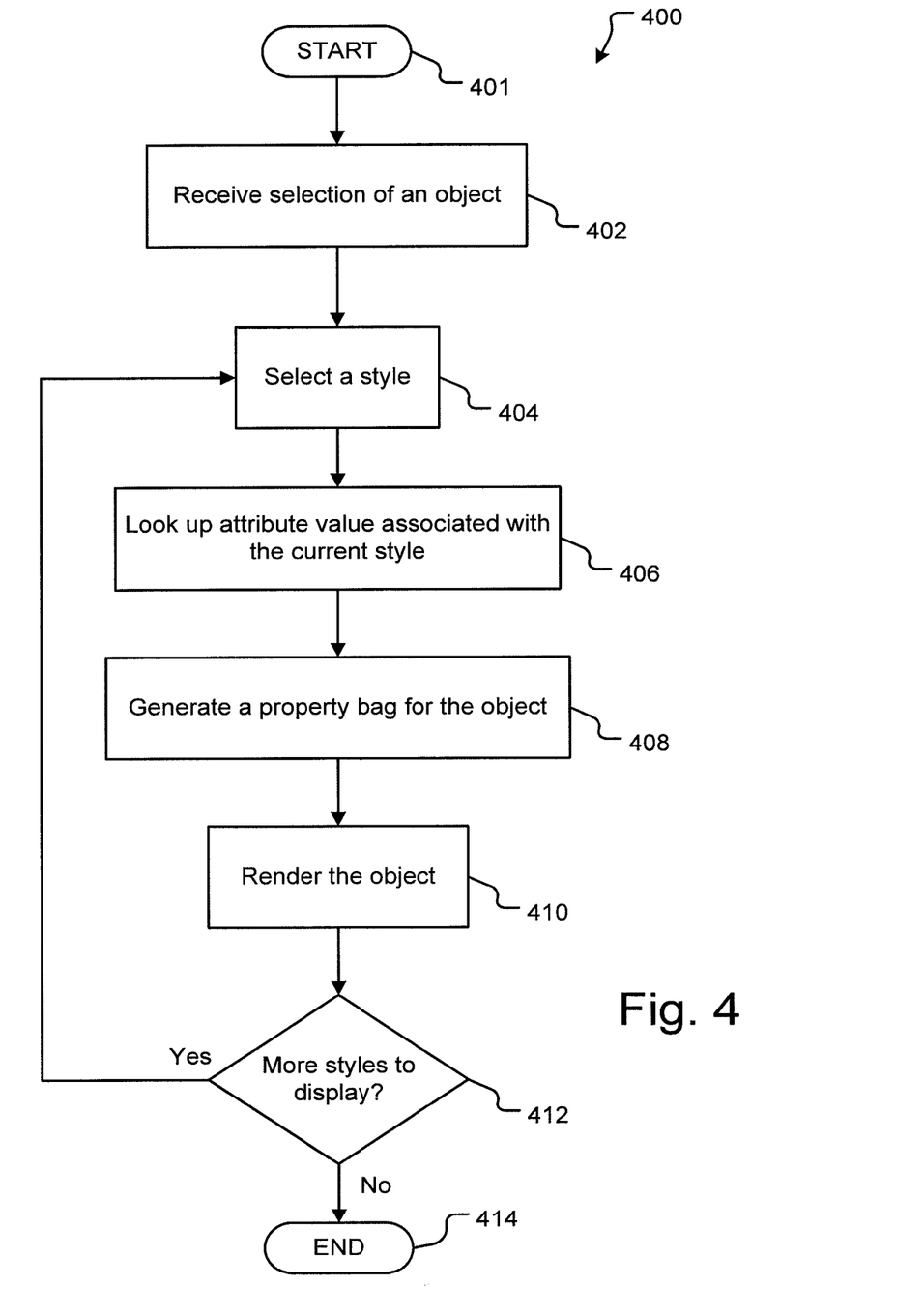
FIG. 4 is a flow diagram illustrating operational characteristics for rendering an object in an electronic document in accordance with another embodiment of the present invention.

Referring now to FIG. 4, a process 400 for rendering (hereinafter, "rendering process") an object using a gallery of styles is shown in accordance with an embodiment of the present invention. This rendering process 400 is performed using an operation flow beginning with a start operation 401 and ending with a terminate operation 414. The start operation 401 is initiated in response to a user requesting the display of the object in an electronic document. From the start operation 302, the operation flow passes to a receive operation 402.

The receive operation 402 receives the selection of an object. In one embodiment, a selection may be received from a user. In an alternate embodiment, a selection may be hardcoded by an application developer. In yet another embodiment, a selection may be chosen by an application using a dynamic selection method based on the current mode of operation, attribute values of other objects in a document, or other criteria.

From the receive operation 402, the operation flow passes to a select operation 404. The select operation 404 selects a style in which the object will be rendered. Selection of a style by the select operation 404 may be performed using a loop that iterates through each of a set of preselected styles, where a style is a combination of attribute references, actual attribute values, or combination thereof. In an embodiment, these preselected styles may be defined by an application developer to include styles that have been carefully chosen to be aesthetically acceptable. Such an embodiment saves the application user the work of having to arrive at professional and aesthetically pleasing styles through trial and error.

Also, the select operation 404 may choose a position in a style matrix 100 populated with aesthetically pleasing attribute values. One skilled in the art will appreciate that such a position may be referred to using matrix coordinates, address pointers into data memory containing matrix data, or other form of data addressing known in the art, without departing from the scope of the claimed invention. Alternatively, the select operation 404 may choose from a style matrix 100 populated with attribute values that comport to a given theme.

Following performance of the select operation 404, the operation flow passes to a look-up operation 406. The look-up operation 406 looks up one or more actual attribute values associated with the selected style. In an embodiment, the look-up operation 406 involves traversing one or more layers of indirection to arrive at actual attribute values. As described previously, attribute references may take the form of matrix coordinates, memory pointers, or other data addressing method known in the art, without departing from the scope of the claimed invention.

From the look-up operation 406, the operation flow passes to a generate operation 408. The generate operation 408 generates a property bag for the object. As discussed above in conjunction with generate operation 308 (FIG. 3), a property bag is a structured grouping of the attribute value(s) associated with an object, as determined by the look-up operation 306. Also as noted above, the attribute value(s) may be copied into either a permanent or temporary property bag data structure associated with an object. Additionally, the property bag may hold other object-specific or inherited general data, in addition to one or more actual attribute values.

Following performance of the generate operation 408, the operation flow passes to a render operation 410, which uses the attribute value(s) specified in the property bag to render the object appropriately in the electronic document. As such, the specified attribute(s), such as, for example, line thickness, fill type and gradient, font boldness, background, bullet types and other effects, are executed according to the referenced actual attribute value(s) contained in the style matrix 100. In an alternative embodiment, these attribute(s) are executed according to a combination of referenced attribute value(s) and attribute value(s) hardcoded by an application developer, as described in greater detail below.

The actual rendering of the object by the render operation 410 may be accomplished using any one of a variety of approaches. For example, the render operation 410 may write the object directly to the screen. Alternatively, the render operation 410 may call an API (Application Program Interface) to draw the object. Other methods of rendering known to those skilled in the art may be used by the render operation 410 and are contemplated within the scope of the present invention.

From the render operation 410, the operation flow passes to a determine operation 412, which determines whether there are additional styles in which the selected object must be rendered. If additional styles need to be rendered, the operation flow branches "YES" to the select operation 404, discussed above. If no additional styles need to be displayed, the operation flow branches "NO" and concludes at the terminate operation 414.

In one embodiment, style portrayals rendered in a gallery may be clicked on or otherwise selected to choose the attribute values associated with that style. New objects created in the application will thus take on attribute values according to the selected style. The gallery thus provides an efficient way to select a collection of aesthetically compatible attributes using only a single click, instead of manually and/or independently selecting each attribute value. In another embodiment, a gallery has a corresponding data structure which represents a style matrix (e.g., 100) of its own, in which each matrix position contains a plurality of attribute values.

In an alternate embodiment, style selections in a gallery may be traversed without actually rendering a gallery. Instead, a "volume control" may be used to modulate how pronounced (and thus "loud," or attention-grabbing) a style an object uses. For example, said volume control may take the form of a slider bar with the least pronounced style on one extremity, and the most pronounced style on the opposite extremity. Each successive advancement in the control corresponds to a more pronounced preselected position in a style matrix or gallery. While a slider bar is described here according to an exemplary embodiment, it should be appreciated that other GUI controls, including, without limitation, a scroll wheel and keyboard, may be used to modulate how pronounced a style is selected.

In yet another embodiment, a gallery is rendered, and a "volume control" is used to traverse the gallery selections and select successively more or less pronounced styles. In still another embodiment, users manually change attribute values independent of the style gallery, but are warned with a popup window or similar notification that they are leaving the "aesthetic safe zone" of predetermined, mutually-compatible attribute values provided in the style matrix. Even further, another embodiment involves users altering computer desktop theme settings using a style matrix (e.g., 100) and style gallery and rendering the computer desktop as an electronic document application object. And yet, even another embodiment involves users controlling document theme settings using a style matrix and style gallery. In this embodiment, substituting one matrix for another generates global changes to a plurality of elements within a document. A wide variety of visual styles can thus be generated without requiring users to manually create a template for each new "look."

Figure 5:
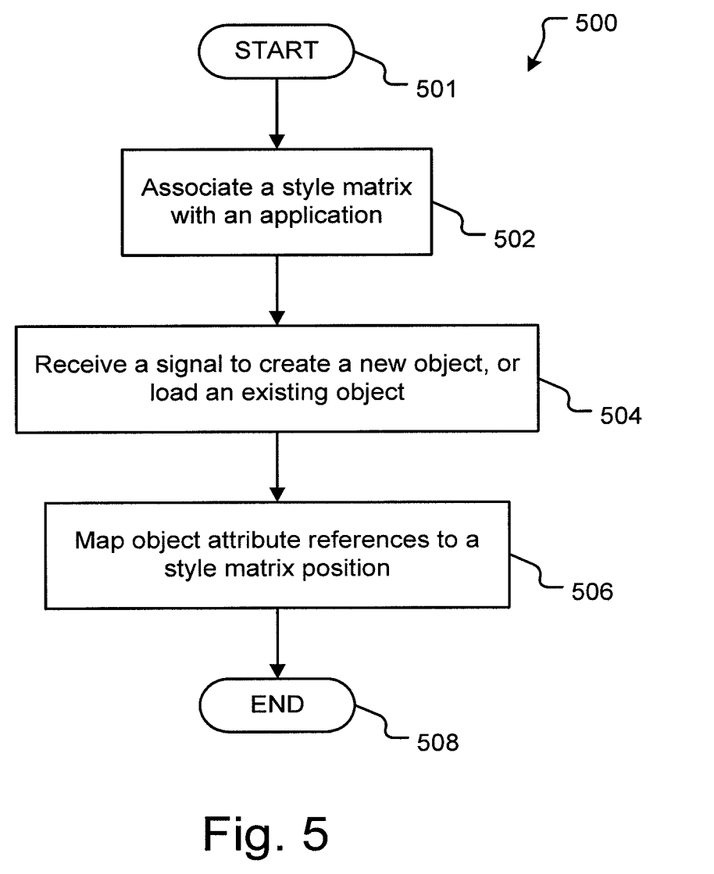
FIG. 5 is a flow diagram illustrating operational characteristics for creating and/or editing a style matrix, such as the style matrix shown in FIG. 1, in accordance with an embodiment of the present invention.

Referring now to FIG. 5, a process 500 for creating ("creation process") style matrices (e.g., 100) is shown in accordance with an embodiment of the present invention. The creation process 500, which may also be administered to alter an existing style matrix (e.g., 100), is performed using an operation flow beginning with a start operation 501 and concluding with a terminate operation 508. The start operation 501 is initiated in response to a user requesting the creation of one or more style matrices (e.g., 100) and proceeds to an associate operation 502. The associate operation 502 first associates one or more new style matrices (e.g., 100) with a given application. In one embodiment, such matrices (e.g., 100) may be created by a developer using trial and error on a wide variety of objects to ensure maximal aesthetic compatibility between the various style attributes in a given style matrix position. In an alternate embodiment, styles may be chosen from a preexisting library of styles. In yet another embodiment, styles may be selected by a computer using an automatic method that, using the "None" and "Most Intense" endpoints, generates middle points along an axis of intensity. From the associate operation 502, the operation flow passes to a receive operation 504 and awaits reception of a signal, as described in the following paragraph. After an application is released to users, the users may leverage its associated style matrix (e.g., 100) to quickly and efficiently select a set of style attributes. In such a case, the receive operation 504 receives a signal to create a new object, load an existing object, or import an object from another application. The attribute references associated with the object are then mapped to a corresponding style in the style matrix by a map operation 506 and the operation flow thereafter concludes at the terminate operation 508.

Figure 6:
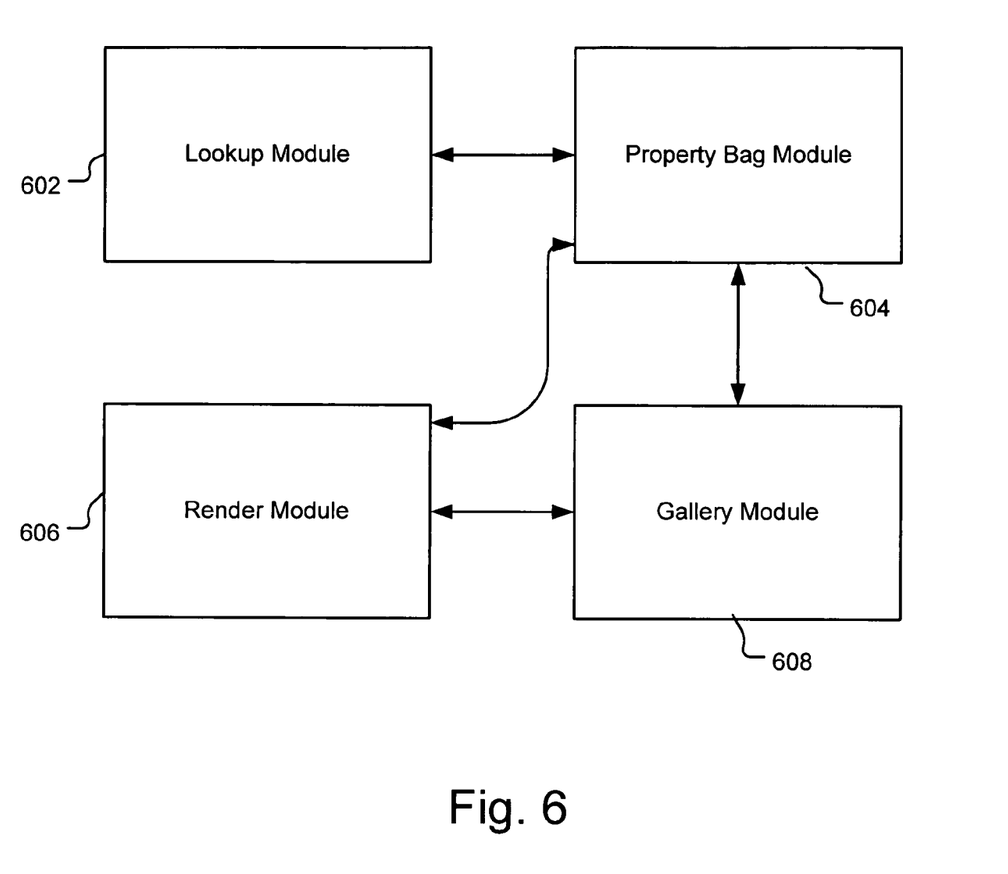
FIG. 6 is a block diagram illustrating the modules that comprise one embodiment of the present invention.

FIG. 6 is a block diagram illustrating modules that comprise one embodiment of the present invention. A lookup module 602 performs reference lookups to find actual attribute values. As such, the lookup module 602 performs the look-up operation 306 and the look-up operation 406 illustrated in FIGS. 3 and 4, respectively according to embodiments of the invention described above. As described in connection with these operations, above, a reference lookup may involve either accessing attribute value(s) defined by a set of one or more coordinates in a style matrix (e.g., 100) or accessing a memory address containing style matrix data using a pointer to memory. Those of skilled in the art will recognize that other forms of addressing data known to those in the art are contemplated within the scope of the present invention.

Property bag module 604 performs creation of property bags, and populates a property bag with the attribute value(s) found by lookup module 602. As such, the lookup module 604 performs the look-up operation 308 and the look-up operation 408 illustrated in FIGS. 3 and 4, respectively according to embodiments of the invention described above. The property bag module 604 is also operable to perform updates on existing property bags in accordance with an embodiment of the present invention. In accordance with another embodiment, the property bag module 604 is also operable to perform deletion of existing property bags and/or reallocation of existing property bags so that they may be reused for other objects.

Render module 606 renders objects using one or more actual attribute value(s) stored in a property bag created by property bag module 604. As such, the lookup module 604 performs the look-up operation 310 and the look-up operation 410 illustrated in FIGS. 3 and 4, respectively according to embodiments of the invention described above. As such, the render module 606 is operable to write objects directly to the screen, or alternatively may render objects through the use of API's. Additionally, the render module 606 may be operable to render objects within a file, but not necessarily to a display device, for later viewing.

A gallery module 608 renders a gallery containing various styles that may be assigned to an object. In one embodiment, style portrayals rendered by the gallery module may be clicked on or otherwise selected to choose the attribute values associated with that style. The gallery module will then propagate those attribute values to the object data structure.

In an alternate embodiment, style selections in the gallery module may be traversed without actually rendering the gallery. Instead, a "volume control" may be provided by the gallery module, as discussed above in conjunction with FIG. 4. In another embodiment, a mouse wheel may be used to modulate how pronounced the selected style is. In yet another embodiment, keystrokes may be used to similar effect. In yet another embodiment, the gallery module renders a gallery, and a "volume control" as discussed above may be used to traverse the gallery selections and select successively more or less pronounced styles.

Figure 7:
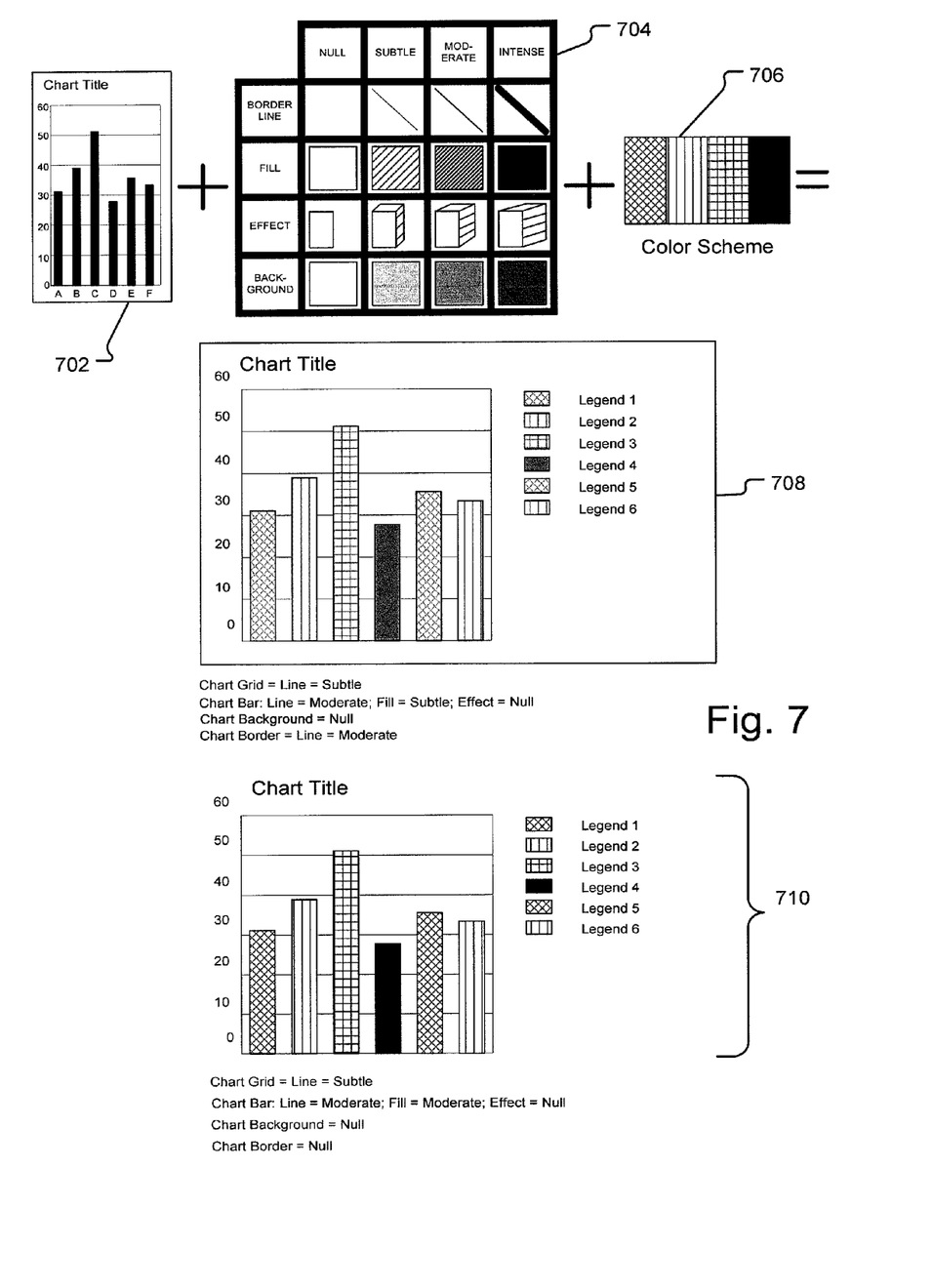
FIG. 7 shows an exemplary embodiment of a style matrix and its relation to electronic document application objects.

Referring now to FIG. 7, shown therein is an illustration of an embodiment of a style matrix 704, and an object rendered using two different sets of attribute values from the style matrix 704. An object 702 exists, which in an embodiment is a chart including a graph. The style matrix 704 includes rows corresponding to various attribute types (e.g., Line, Fill, Effect, and Background) and columns corresponding to various attribute values (e.g., Null, Subtle, Moderate, Intense). At each intersection of a column and row, a given attribute type with a given attribute value is portrayed. For example, a Subtle attribute value of type Line depicts a thin line, whereas an Intense attribute value of type Line depicts a much thicker and more easily seen line.

When an object 702 is combined with the style matrix 704 and a color scheme 706, the three combine to form a rendered object (708, 710). One rendered object 708 is shown that includes a chart grid with a Subtle Line attribute value, a chart bar with a Moderate Line attribute value, a Subtle Fill attribute value, and a "Null" Effect attribute value (which indicates no effect should be used). Rendered object 708 also has a Null Background attribute value, and a chart border with a Moderate Line attribute value.

In contrast, rendered object 710 is shown which results from a different combination of attribute values than rendered object 708. Rendered object 710 includes a chart grid with a Subtle Line attribute value, a chart bar with a Moderate Line attribute value, a Moderate Fill attribute value, and a "Null" Effect attribute value (which indicates no effect should be used). Rendered object 710 further includes a Null Background attribute value, and Null Line value for its chart border. One skilled in the art will appreciate that the fill styles for the chart bars, and the line styles for the chart borders are different between the two rendered objects 708 and 710.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims. For example, the style matrix 100 is shown in FIG. 1 and described herein with the columns 102 being associated with attribute values and the rows 104 being associated with attribute types, but may alternatively present attribute types in the columns 102 and attribute values in the rows 104.

Embodiments of the present invention involve attributes being addressed in attribute references using either coordinate mapping or pointers, both of which uniquely define an attribute by row 104 (e.g., attribute type) and column 102 (e.g., attribute value) in the style matrix 100. As a result, an embodiment of the present invention eliminates the need to store or maintain attributes within each particular object. One skilled in the art will appreciate that this level of indirection has many other advantages including, among other things, a memory savings and more efficient portability of objects (and thus, electronic documents) from one application program to another.

What is claimed is:

1. A computer-implemented method for rendering an electronic document chart, comprising:
   receiving a selection of the electronic document chart to be rendered;
   displaying a style matrix in a gallery, the style matrix comprising a plurality of rows and a plurality of columns,
      wherein each row of the plurality of rows is displayed with a type header of a plurality of type headers that matches a single attribute type of a plurality of single attribute types; wherein each row of the plurality of rows is displayed with a different type header matching a different single attribute type of the plurality of single attribute types from each other row of the plurality of rows; wherein the plurality of type headers are selected from a group consisting of: Border Line, Fill, Effect, Background, Bullet, and Font; and wherein the plurality of single attribute types are selected from a group consisting of: Border Line, Fill, Effect, Background, Bullet, and Font; and
      wherein each column of the plurality of columns is displayed with a value header of a plurality of value headers that matches a single attribute value of a plurality of single attribute values; wherein each column of the plurality of columns is displayed with a different value header matches a different single attribute value of the plurality of single attribute values from each other column of the plurality of columns; wherein the plurality of value headers are selected from a group consisting of: None, Low, High, Gradient, Thick, and Bold; and wherein the plurality of single attribute values are selected from a group consisting of: None, Low, High, Gradient, Thick, and Bold;
   displaying a preview of an attribute at an intersection of a row of the plurality of rows and a column of the plurality of columns in the style matrix, the attribute comprising a combination of a single attribute type associated with the row and a single attribute value associated with the column in the style matrix;
   receiving a selection of the attribute;
   associating the electronic document chart with the attribute; and
   rendering the electronic document chart by applying the attribute to the electronic document chart.

2. The computer-implemented method as defined in claim 1, further comprising altering the preview of the attribute using a volume control to modulate an attribute intensity.

3. The computer-implemented method as defined in claim 1, wherein receiving the selection of the electronic document chart to be rendered causes the style matrix to be displayed on a display device.

4. The computer-implemented method as defined in claim 1, further comprising: generating a property bag for rendering the electronic document chart comprising the attribute.

5. The computer-implemented method as defined in claim 4, further comprising the steps of:
displaying a color scheme with selectable colors; and
receiving a selection of one or more of the selectable colors for inclusion in the property bag.

6. A computer storage medium not consisting of a modulated data signal, the computer storage medium accessible to a computing system and encoding a computer program for executing a method of rendering an electronic document object, the method comprising:
receiving a selection of the electronic document chart to be rendered;
displaying a style matrix in a gallery, the style matrix comprising a plurality of rows and a plurality of columns,
wherein each row of the plurality of rows is displayed with a type header of a plurality of type headers that matches a single attribute type of a plurality of single attribute types; wherein each row of the plurality of rows is displayed with a different type header matching a different single attribute type of the plurality of single attribute types from each other row of the plurality of rows; wherein the plurality of type headers are selected from a group consisting of: Border Line, Fill, Effect, Background, Bullet, and Font; and wherein the plurality of single attribute types are selected from a group consisting of: Border Line, Fill, Effect, Background, Bullet, and Font; and
wherein each column of the plurality of columns is displayed with a value header of a plurality of value headers that matches a single attribute value of a plurality of single attribute values; wherein each column of the plurality of columns is displayed with a different value header matches a different single attribute value of the plurality of single attribute values from each other column of the plurality of columns; wherein the plurality of value headers are selected from a group consisting of: None, Low, High, Gradient, Thick, and Bold; and wherein the plurality of single attribute values are selected from a group consisting of: None, Low, High, Gradient, Thick, and Bold;
displaying a preview of an attribute at an intersection of a row of the plurality of rows and a column of the plurality of columns in the style matrix, the attribute comprising a combination of a single attribute type associated with the row and a single attribute value associated with the column in the style matrix;
receiving a selection of the attribute;
associating the electronic document chart with the attribute; and
rendering the electronic document chart by applying the attribute to the electronic document chart.

7. The computer storage medium as defined in claim 6, further comprising: altering the preview associated with the attribute using a volume control to modulate attribute intensity.

8. The computer storage medium as defined in claim 6, wherein receiving the selection of the electronic document object to be rendered causes the style matrix to be displayed on a display device.

9. The computer storage medium as defined in claim 6, further comprising: generating a property bag for rendering the electronic document object comprising the attribute.

10. The computer storage medium as defined in claim 9, further comprising the steps of:
displaying a color scheme with selectable colors; and
receiving a selection of one or more of the selectable colors for inclusion in the property bag.

11. A computer system for rendering an electronic document chart in an electronic document application, comprising:
at least one processing unit; and
at least one memory, communicatively coupled to the at least one processing unit and containing instructions that, when executed by the at least one processing unit, perform a method, comprising:
receiving a selection of the electronic document chart to be rendered;
displaying a style matrix in a gallery, the style matrix comprising a plurality of rows and a plurality of columns,
wherein each row of the plurality of rows is displayed with a type header of a plurality of type headers that matches a single attribute type of a plurality of single attribute types; wherein each row of the plurality of rows is displayed with a different type header matching a different single attribute type of the plurality of single attribute types from each other row of the plurality of rows; wherein the plurality of type headers are selected from a group consisting of: Border Line, Fill, Effect, Background, Bullet, and Font; and wherein the plurality of single attribute types are selected from a group consisting of: Border Line, Fill, Effect, Background, Bullet, and Font; and
wherein each column of the plurality of columns is displayed with a value header of a plurality of value headers that matches a single attribute value of a plurality of single attribute values; wherein each column of the plurality of columns is displayed with a different value header matches a different single attribute value of the plurality of single attribute values from each other column of the plurality of columns; wherein the plurality of value headers are selected from a group consisting of: None, Low, High, Gradient, Thick, and Bold; and wherein the plurality of single attribute values are selected from a group consisting of: None, Low, High, Gradient, Thick, and Bold;
displaying a preview of an attribute at an intersection of a row of the plurality of rows and a column of the plurality of columns in the style matrix, the attribute comprising a combination of a single attribute type associated with the row and a single attribute value associated with the column in the style matrix;
receiving a selection of the attribute;
associating the electronic document chart with the attribute; and
rendering the electronic document chart by applying the attribute to the electronic document chart.

12. The computer system as defined in claim 6, further comprising: altering the preview associated with the attribute using a volume control to modulate attribute intensity.

13. The computer storage medium as defined in claim 11, wherein receiving the selection of the electronic document object to be rendered causes the style matrix to be displayed on a display device.

14. The computer system as defined in claim 11, further comprising: generating a property bag for rendering the electronic document chart comprising the attribute.

15. The computer system as defined in claim 14, further comprising:
   displaying a color scheme with selectable colors; and
   receiving a selection of one or more of the selectable colors for inclusion in the property bag.

16. The computer system of claim 14, further comprising:
   associating the property bag with the electronic document chart;
   transferring the electronic document chart to another electronic document application; and
   rendering the electronic document chart in another electronic document application according to the associated property bag.

17. The computer system as defined in claim 11, wherein the style matrix displays a gallery of visually compatible attributes.

18. The computer system as defined in claim 14, wherein the property bag further comprises at least one of: electronic document object-specific data and general inherited data.

19. The computer system as defined in claim 14, wherein the generated property bag is temporary.

* * * * *